United States Patent [19]

Willinger

[11] 4,186,093

[45] Jan. 29, 1980

[54] BOTTOM AQUARIUM FILTER

[75] Inventor: Allan H. Willinger, New York, N.Y.

[73] Assignee: Willinger Bros., Inc., New York, N.Y.

[21] Appl. No.: 861,543

[22] Filed: Dec. 19, 1977

[51] Int. Cl.[2] .............................................. E04H 3/20
[52] U.S. Cl. .................................................. 210/169
[58] Field of Search ........................... 210/169, 79–81, 210/106, 194, 196, 197

[56] References Cited

U.S. PATENT DOCUMENTS

| | | | |
|---|---|---|---|
| 2,335,756 | 11/1943 | Haldeman | 210/169 |
| 2,782,161 | 2/1957 | Willinger et al. | 210/169 |
| 3,362,537 | 1/1968 | Cline | 210/169 |
| 3,477,580 | 11/1969 | Willinger | 210/169 |
| 3,487,935 | 1/1970 | Lovitz | 210/169 |
| 3,540,591 | 11/1970 | Yamazaki | 210/169 |
| 3,540,593 | 11/1970 | Stewart | 210/169 |
| 3,630,367 | 12/1971 | Willinger | 210/169 |
| 3,774,766 | 11/1973 | Brock | 210/169 |
| 3,827,560 | 8/1974 | Morton | 210/169 |
| 3,892,663 | 7/1975 | Wiedenmann | 210/169 |

Primary Examiner—Theodore A. Granger
Attorney, Agent, or Firm—Friedman, Goodman & Teitelbaum

[57] ABSTRACT

A bottom aquarium filter for an aquarium tank which includes a container having an inlet compartment which can receive contaminated water from the tank, and a filtration compartment which converts the contaminated water into decontaminated water. The filtration compartment contains a mass of filtering material with a restraining plate positioned in the filtration compartment to restrain the filtering material within one section thereof while maintaining another section substantially free of such filtration material, thereby providing a flow chamber which couples the inlet compartment to the section containing the filtering material. An air diffuser, attached by tubing to an air compressor located outside the aquarium tank, provides a stream of air bubbles to lift water from the decontaminated water compartment through an air lift tube. In this manner, contaminated water from the tank enters into the inlet compartment and from there passes through the flow chamber into the section containing the filtering material where the contaminated water is substantially decontaminated. The water then leaves together with the air through an outlet in the air lift tube and back into the tank. The flow chamber is also provided with inlets for receiving contaminated water from the aquarium tank. The bottom wall of the filter is provided with a weighted member to prevent the filter from floating up from the bottom of the tank.

20 Claims, 14 Drawing Figures

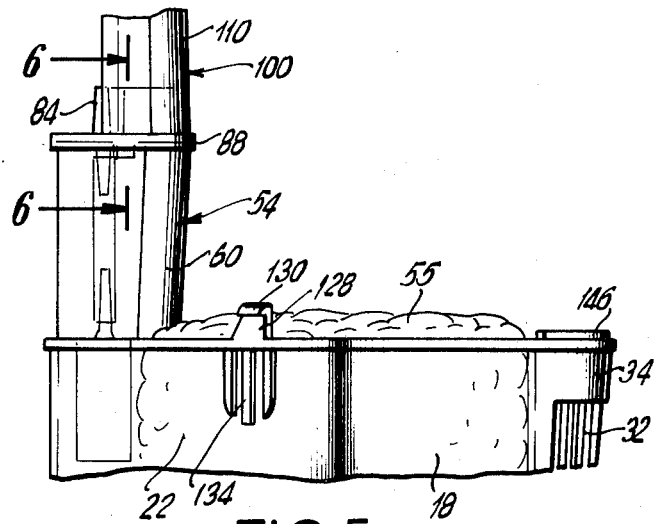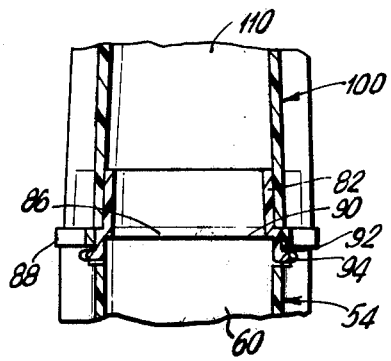
FIG.5  FIG.6
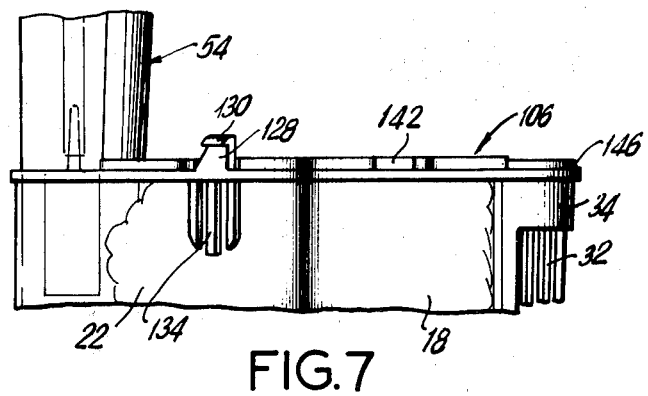
FIG.7
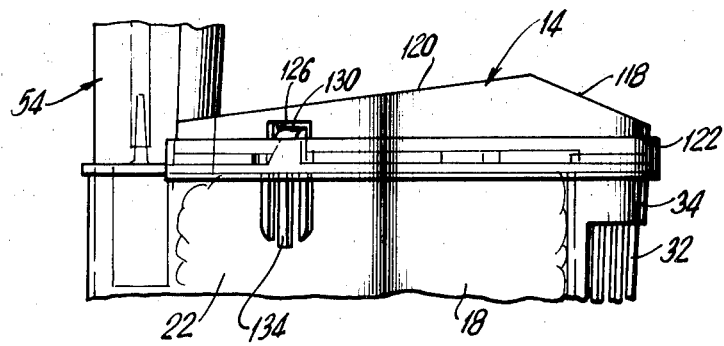
FIG.8

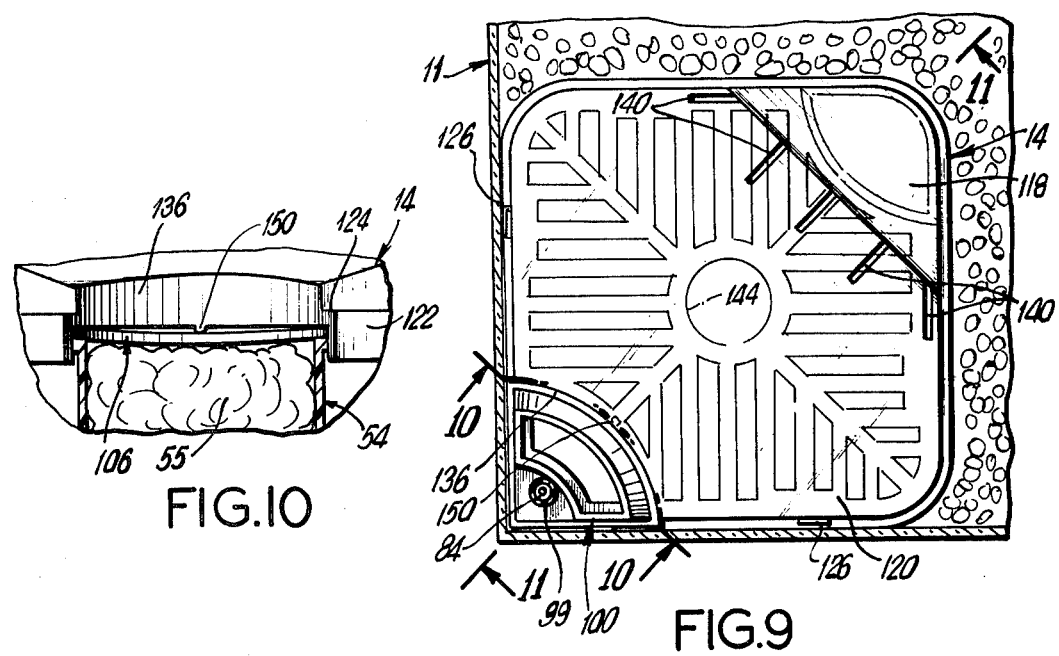
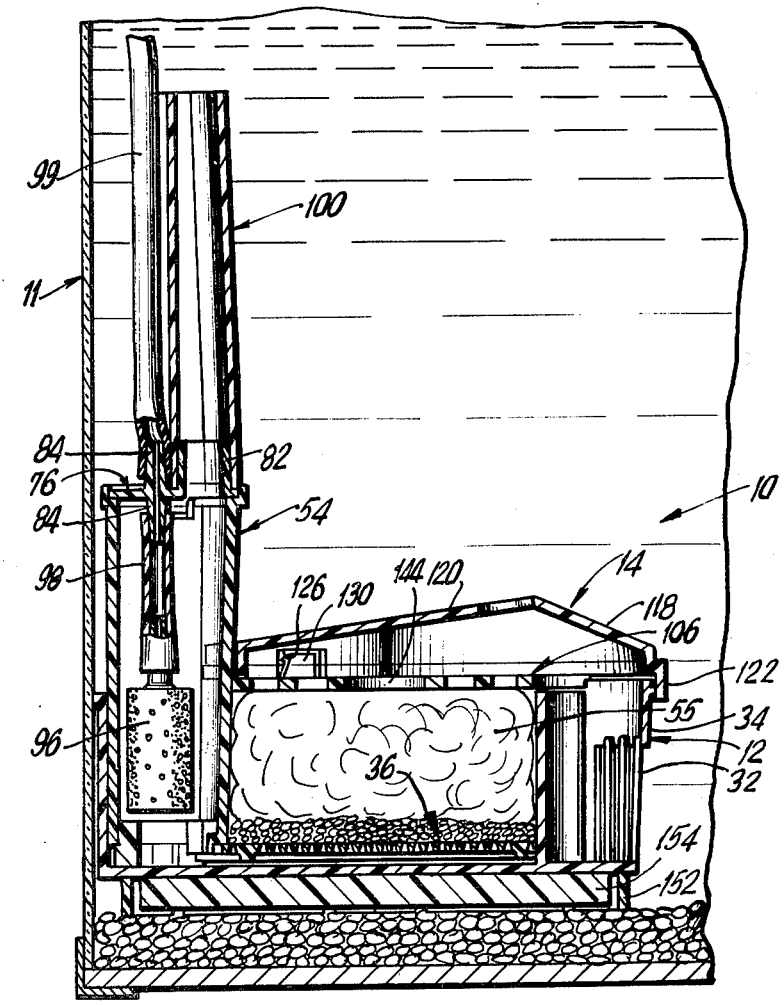

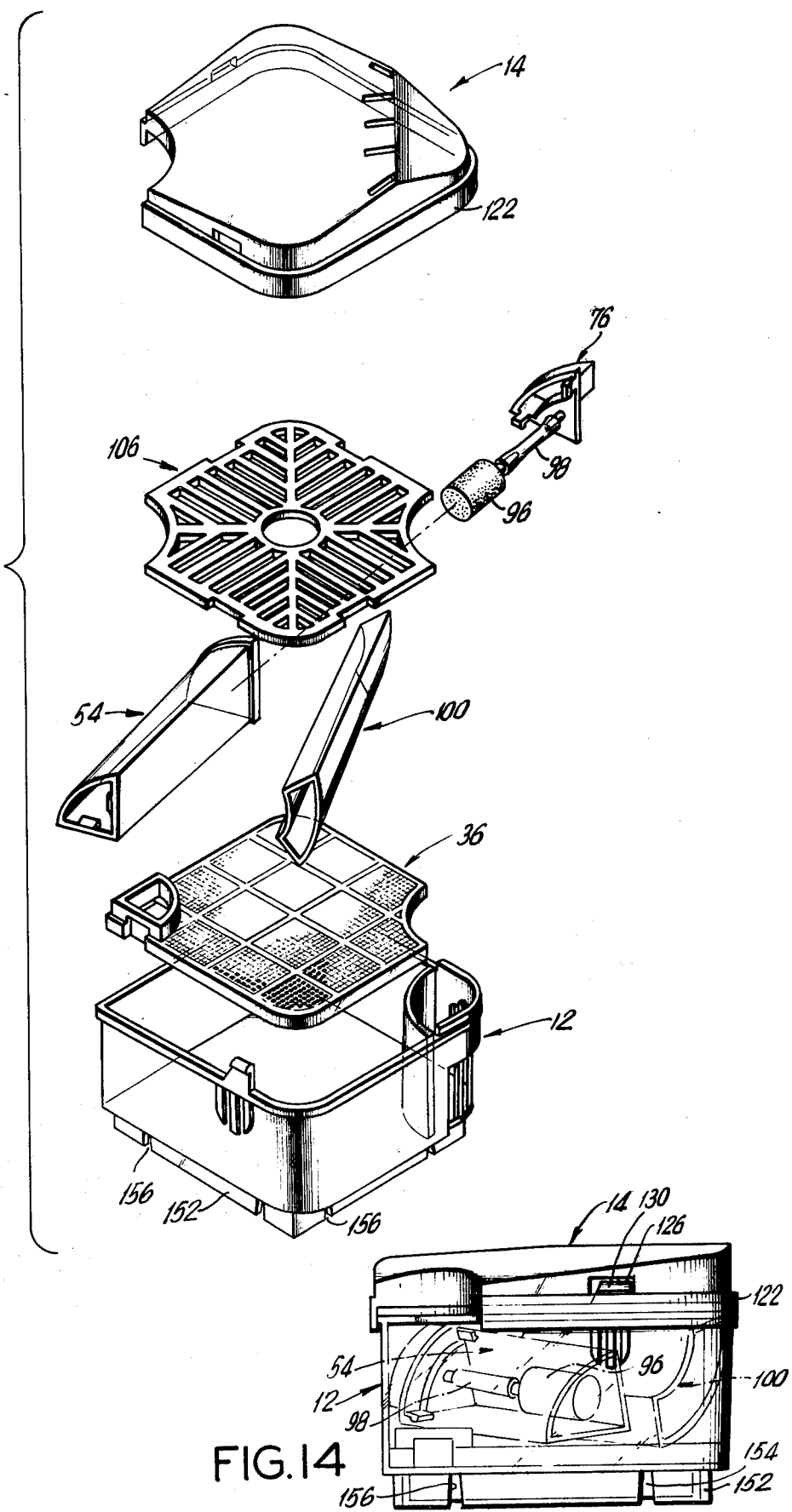

BOTTOM AQUARIUM FILTER

BACKGROUND OF THE INVENTION

This invention relates to aquarium filters, and more particularly to bottom aquarium filters which can be positioned above the gravel bed in an aquarium tank.

One of the most commonly used type of aquarium filters is the bottom aquarium filter which is positioned in the tank above the gravel bed, such as shown in U.S. Pat. No. 2,782,161 and my U.S. Pat. Nos. 3,477,580 and 3,630,367. These filters contain filtration material to remove aquarium sewerage and convert contaminated water into decontaminated water which is then sent back to the tank. At the same time, an air stream is sent into the filter's air lift tube to circulate the flow of water into and out of the filter, as well as to aerate the water, whereby the filter becomes both an aerating as well as a filtering device.

One of the problems of bottom aquarium filters concerns the proper arrangement and retention of the filtering material within the filter. Typically, the bottom aquarium filter includes a container which stores the filtering material. However, in order to ensure a sufficient flow of water into the container and to provide adequate circulation of the water through the container, various compartments are formed for specific purposes within the container. For example, a separate compartment is usually provided for taking in or receiving the contaminated water. Then, this water passes through the filtering material which is in another compartment of the container.

A problem also exists in connection with the quantity of filtering material placed within the container. When the filtering material, such a polyester floss, is initially placed in the container, it is dry and fluffy with a lot of air space between the filaments. As a result, it is very compactable and occupies a large amount of space within the container where the polyester floss must be compressed to be an effective filtering material. Subsequently, when the filter is inserted into the aquarium tank, the compacted filtering material becomes wet and traps air bubbles therein, where the trapped air bubbles cause the material to float upwardly, thus blocking free flow of the contaminated water into the filtration compartment.

In many aquarium filters, the carbon of the filtering material is used as weight to prevent the filter from floating up from the bottom of the tank. However, due to improved modern day activated carbon, less carbon is required where one ounce of carbon granules can actually contain the equivalent of seven acres of adsorbent surface area. Additionally, this new type of carbon is lighter in weight than previously used carbon. Therefore, other means such as using gravel or even marbles must be used in order to weight the filter, where this other material is usually placed in the filtration compartment for lack of a better place, thus reducing the effectiveness of the filtration compartment.

An additional problem concerns proper distribution of the water through the filtering material. Once the water enters the container, it typically will pass through a small section of the filtering material and will not be evenly distributed through the filtering material. As a result, while one section of the filtering material becomes heavily contaminated and clogged with debris, other parts of the filtering material are hardly used. Nevertheless, because of the contaminated small area of filtering material, it will be necessary to throw out all of the filtering material and replace it, even though most of it is hardly used. Furthermore, the heavily contaminated section of the material does not provide a proper environments for aerobic bacteria which are helpful in filtering the contaminated water.

Other problems also exist with present types of bottom aquarium filters. For example, the bottom aquarium filter typically fits on top of the gravel bed. As a result, it is visible within the aquarium tank and its size and location become of importance with respect to aesthetics as well as to the capacity of the tank. It is desirable to have the filter occupy as small an area of the tank as possible, and preferably positionable in a rear corner of the tank for unobtrusiveness. Furthermore, since the aquarium filter must occasionally be taken out of the water in order to replace the filtering material, it is desirable to provide a handy means for pulling the filter out of the water without having it become disassembled accidentally by itself, yet provide sufficient ease for the user to disassemble it in order to replace the filtering material.

With prior art bottom aquarium filters, the size was so tall that it was very obtrusive in the tank. Furthermore, when pulling the bottom aquarium filter out of the water, it was either necessary to manually hold the filter together or risk the possibility that the parts may open up in the water while being removed. Some prior art devices trying to prevent such accidental disassembly in the water, made secure locking mechanisms to hold the parts of the filter together. However, it then became exceedingly difficult to disassemble the filter in order to replace the filtering material. On the other hand, some prior art filtering devices tried to maintain ease of disassembly to replace the filtering material, but they then risked accidental disassembly of the filter when in the water.

SUMMARY OF THE INVENTION

The aforementioned problems are solved in the present invention by providing a bottom aquarium filter including a container which is divided into various sections or compartments. An inlet compartment is provided for receiving the contaminated water from the tank. A filtration compartment is provided, which is divided by a restraining plate into a filtering section which contains the filtering material and a flow chamber which couples, in fluid flow relationship, the inlet compartment with the filtering section. The flow chamber is also provided with inlets for receiving contaminated water from the tank. A perforated platform is provided in the filtering section which further divides that section into a filter chamber and a clear water chamber, with the filtering material being retained in the filter chamber. An air diffuser provides air to the filtration compartment, and an air lift tube permits decontaminated water and air to egress from the filtration compartment. The bottom wall of the filter is provided with a weighted member.

In operation, the contaminated water enters both the inlet compartment and the flow chamber. The restraining plate maintains the flow chamber free of filtration material and permits the contaminated water to spread therethrough over a large area to distribute itself throughout the flow chamber. The contaminated water then passes into the filtering chamber where it is filtered by the filtering material. The spread of contaminated water permits substantially all of the filtering material to be utilized over its entire volume. The decontaminated or filtered water then passes into the clear water chamber where it is brought up through the air lift tube to provide aerated and decontaminated water back into the tank.

By forming the container substantially shallow and flat in a compact construction with a relatively large cross sectional area, the best efficient use is made of the filtering material while providing an unobtrusive filter in the tank. The air lift tube is provided with a secure locking mechanism connecting it to the perforated platform so that it can be used as a handle to extract the filter from the water without having the filter become disassembled. The other portions are provided with releasable locking mechanisms to easily be disassembled for replacement of the filtering material. The container with the inlet and air lift tube is shaped to permit the filter to placed in the corner of the aquarium tank, and provide a screen to conceal an air tube which provides the air to the filter. The filter is weighted to prevent the filter from floating up from the bottom of the tank.

The filter is also provided with symmetrical portions within the container whereby the restraining plate can easily be inserted into the container in either an inverted or reversible position thereby facilitating its assembly. The other parts of the filter are shaped to provide single position assembly which avoids complex assembly instructions or difficulty in manipulating the filter. Furthermore, the parts are of a size and shape which permit them to be integrated for ease of packaging and storing prior to assembly by the user.

Accordingly, it is an object of the present invention to provide a new and improved bottom aquarium filter.

Another object of the present invention is to provide a bottom aquarium filter which is more efficient in operation than prior art filters.

A further object of the present invention is to provide a bottom aquarium filter which includes a restraining plate for restricting the location of the filtering material within the filter.

Still another object of the present invention is to provide a bottom aquarium filter which includes a container having a flow chamber free of filtration material for distributing the decontaminated water within the container to thereby provide a more efficient use of the filtering material.

Yet a further object of the present invention is to provide a bottom aquarium filter which includes means for separating the filter into numerous chambers to provide more efficient circulation of the water within the filter.

A further object of the present invention is to provide a bottom aquarium filter which includes a cover which is shaped to improve the circulation and flow of water through the flow chamber and provide a more uniform distribution of the water in the filter.

A further object of the present invention is to provide a bottom aquarium filter which includes a plurality of easily assembled parts to initially install the filter and to provide subsequent ease of replacement of the filtering material within the filter.

Yet a further object of the present invention is to provide a bottom aquarium filter which is substantially unobtrusive and can easily be retained within a corner portion of the aquarium tank, where the filter is weighted to prevent floating thereof.

Still another object of the present invention is to provide a bottom aquarium filter which includes an improved air lift tube for egress of the decontaminated water and air from the filter.

Yet another object of the present invention is to provide a bottom aquarium filter which includes an air lift tube which can maintain an air diffuser in position, where the air lift tube fits in the corner of the tank.

Another object of the present invention is to provide a bottom aquarium filter which is substantially compact and includes a wide cross sectional area for improved efficiency.

Still a further object of the present invention is to provide a bottom aquarium filter which includes a plurality of parts which can be integrated, to provide a compact packaging and storage arrangement.

Briefly, there is provided a bottom aquarium filter for an aquarium tank comprising a container having an inlet compartment which is in fluid flow relationship with the tank. There is also provided in the container a filtration compartment in fluid flow relationship with the inlet compartment. The filtration compartment is adapted to contain a mass of filtering material. A restraining plate is positioned in the filtration compartment for restricting the filtering material to a filtering section of the filtration compartment and provides another section of the filtration compartment which functions as a flow chamber. The flow chamber is also provided with inlets for receiving contaminated water from the tank. The flow chamber provides a fluid flow coupling between the inlet compartment and the filtering section. An air diffuser disposed in the container directs air into a decontaminated water compartment. An air lift tube coupled to the filtration compartment permits the egress of decontaminated water and air out of the decontaminated water compartment. In this manner, contaminated water from the tank which enters into the inlet compartment and passes therefrom to the flow chamber where it mixes with additional contaminated water from the tank, and then all the contaminated water passes to the filter section where the contaminated water is substantially decontaminated by the filtering material before being egressed through the air lift tube into the tank.

In an embodiment of the invention, the restraining plate is perforated and maintains the flow chamber substantially free of filtering material.

In a further embodiment of the invention, the air lift tube includes an elongated member which is retained adjacent the back wall of the container. A front wall of the elongated member is positioned internally of the filtration compartment. The respective shape of the elongated front wall and the partition wall which separates the inlet compartment from the filtration compartment, are symmetrical about a common vertical plane. The restraining plate is positioned perpendicular to this common plane and further comprises symmetrical reliefs to accommodate the partition wall and the elongated front wall. In this manner, the restraining plate is both reversibly and invertibly positionable in the container.

In a further embodiment of the invention, the restraining plate is removable from the container and there is also included a removable platform positionable within the filtration compartment. The elongated member is pie-shaped and is positionable onto the platform. A pie-shaped plug is removably positionable into the upper end of the elongated pie-shaped member. The outlet means of the air lift tube include a substantially C-shaped elongated member which is removably positionable on the plug and fits into the corner of the tank. A cover is removably positionable into the container. All of the parts can be integrally assembled for storage and packaging, within the container and cover.

BRIEF DESCRIPTION OF THE DRAWINGS

With the above and additional objects and advantages in view, as will hereinafter appear, this invention comprises the devices, combinations and arrangement of parts hereinafter described by way of example and illustrated in the accompanying drawings of a preferred embodiment in which:

FIG. 5 is a partial side view showing the air lift tube interconnected to the container;

FIG. 6 is a partial sectional view taken along line 6—6 of FIG. 5, showing the interconnection between the elongated members forming the air lift tube;

FIG. 7 is a partial side view of the container including the restraining plate;

FIG. 8 is a partial side view similar to that of FIG. 7 and including the cover;

FIG. 9 is a top view of the filter positioned in the corner of the aquarium tank;

FIG. 10 is a sectional view taken along line 10—10 of FIG. 9, showing the retaining ridge between the cover and restraining plate;

FIG. 11 is a sectional view taken along line 11—11 of FIG. 9, showing a diagonal view through the container positioned in the corner of the aquarium tank;

FIG. 13 is an exploded view of the filter showing a position for assembly thereof for packaging and storage; and FIG. 14 shows a side view of the assembled device as packaged and stored prior to use.

In the various figures of the drawing, like reference characters designate like parts.

DESCRIPTION OF THE PREFERRED EMBODIMENT

Figure 1:
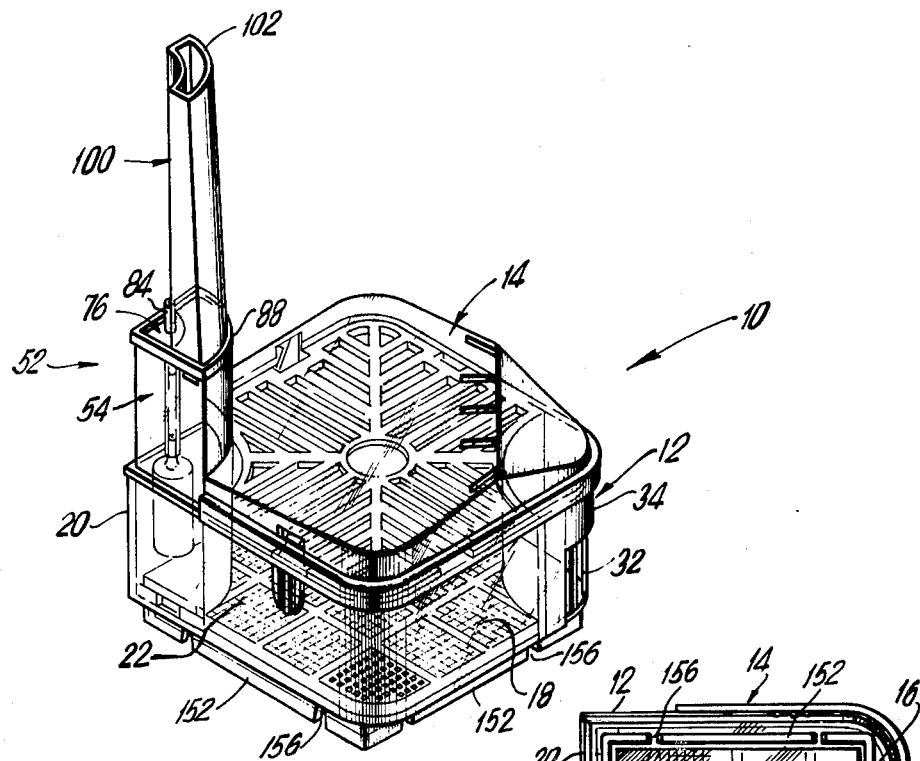
FIG. 1 is a isometric view of the assembled bottom aquarium filter in accordance with the present invention.

Referring now to the drawings, there is shown a bottom aquarium filter 10 which can be positioned on the bottom of an aquarium tank 11 wherein it will filter the contaminated water from the tank and send back aerated and decontaminated water into the tank. As shown in the figures, the filter comprises a container 12 which houses the various parts of the filter and also holds the filtering material. A cover 14 is preferably removable and encloses the upper end of the container 12.

The container 12 is shown as having a substantially rectangular shape including a bottom wall 16 and opposing front wall and rear wall 20 extending upwardly from the bottom wall 16 and substantially normal thereto. The rear wall 20 is advantageously a V-shaped member having a left section 22 and a right section 24 formed substantially normal with respect to each other.

The front wall 18 is advantageously a curved linear member having left and right sections normal to each other and connected by a bight section. The front wall extends between the opposite ends of the V-shaped rear wall 20, and along the lines of each juncture therewith being substantially normal thereto, where the junctures are preferably curved. The container 12 is provided with an inlet compartment or supply chamber 26 in fluid flow relationship with a filtering compartment 28. A curved linear partition wall 30 extends upwardly from the bottom wall 16 and separates the inlet compartment from the filtering compartment 28. The partition wall 30 is formed substantially normal to the bottom wall 16 and merges into the front wall 18 on opposite sides of the bight section. The partition 30 is securely connected within the container to define and position the inlet compartment 26 adjacent to the filtration compartment 28 in a fluid flow relationship therewith, where both the inlet and filtration compartments have open top ends.

The bottom wall 16 of the container is utilized as the base of both the filtration compartment 28 and the inlet compartment 26 and is substantially planar throughout. The inlet compartment 26 is provided with inlet means which may advantageously be an opening in the lower portion or end of the bight section through which contaminated water from the tank 11 may flow. The opening is advantageously comprised of slots 32 upwardly extending from the base wall 16 at least partway along the front bight section 34 of the front wall 18. The slots 32 are formed to accommodate the passage therethrough of contaminated aquarium water while avoiding the passage therethrough of fish and other items remaining in the aquarium tank. The partition wall 30 separates the front bight section 34 of the front wall from the remainder thereof. Through the slots 32, contaminants such as debris, dirt, excretion, wastes, food wastes and the like entrained within the water, are caused to flow when an air stream directed into the filter 10 causes air to flow into a decontaminated water compartment and to airlift clean water therefrom.

The main filtration compartment includes a platform 36 containing a grid of support ribs 38 coupled to an outer frame 40 which extends downwardly from the surface 44 of the platform to provide a support skirt 42 which will support and raise the platform surface 44 from the bottom wall 16 of the filtration compartment. The platform 36 contains screen-like small perforations in the surface thereof between the ribs 38. The platform is positioned on the bottom of the filtration compartment and divides that compartment into a filter chamber and a clear water chamber. The chambers are in fluid flow relationship through the small perforations formed in the platform. The clean water chamber is formed between the platform surface 44 and the bottom wall 16. The platform includes an arcuate relief section 46 at the front thereof to accommodate the partition wall 30.

An air lift tube and an air diffuser assembly 52 provides air into the filter 10 to airlift the clean water therefrom. The air lift tube includes a first elongated member 54 of substantially pie-shaped configuration and including adjacent walls 56 and 58 which are substantially perpendicular to each other with an arcuate front wall 60 interconnecting the two perpendicular walls to define the decontaminated water compartment. The elongated member 54 is tapered downwardly, whereby the lower edge 62 thereof is of smaller cross sectional area than its upper edge 64.

Figure 4:
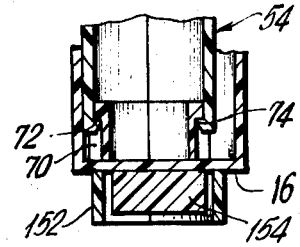
FIG. 4 is a partial sectional view taken along line 4—4 of FIG. 3, showing the locking mechanism between the elongated member and the perforated platform.
Figure 2:
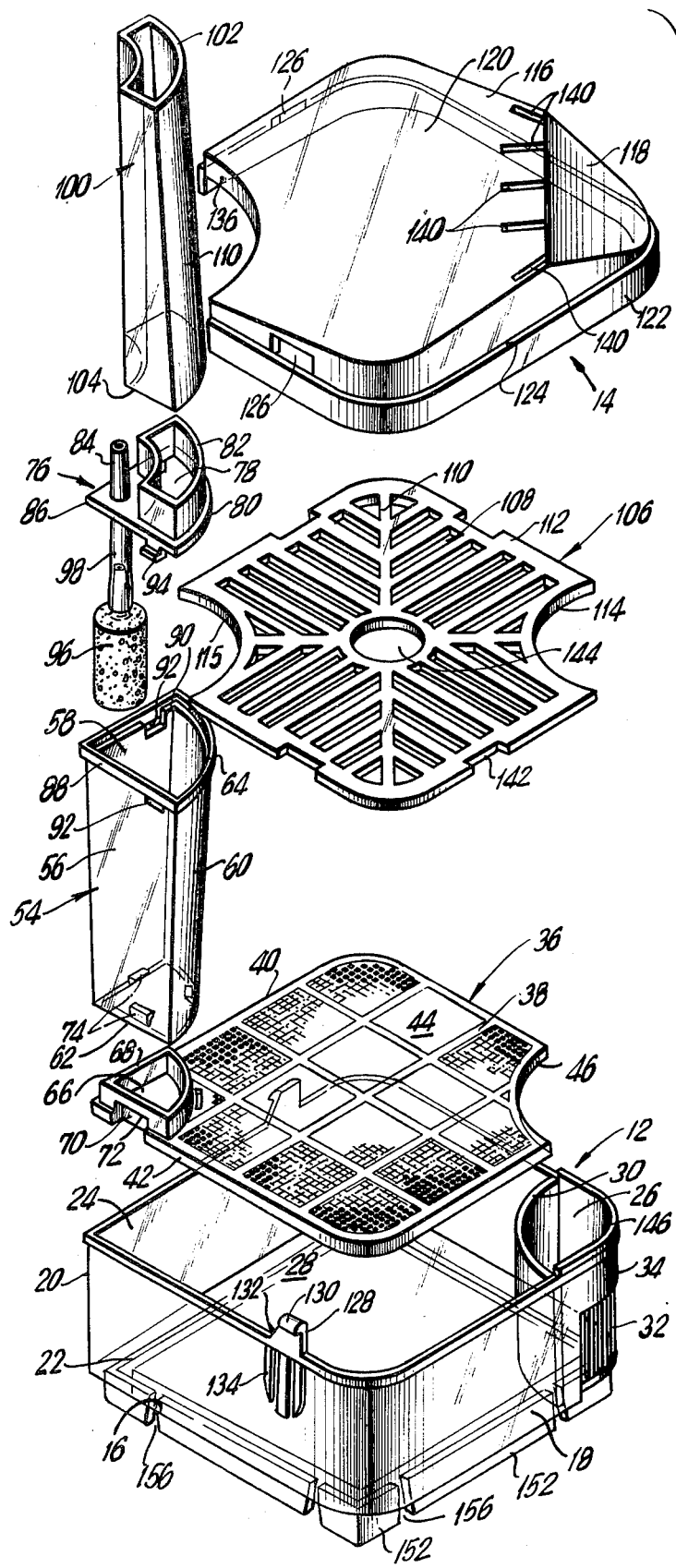
FIG. 2 is an exploded view of the filter.

A passageway 66 of pie-shaped configuration is formed at the rear corner of the platform 36 and includes an upwardly extending rim 68 around the passageway, being also of substantially pie-shaped configuration. The rim 68 telescopically receives the lower end 62 of the first elongated member 54. As best seen in FIGS. 2 and 4, in order to secure the coupling between the elongated member 54 and the platform, notches 70 are formed upwardly from the bottom through the peripheral edge or skirt 42 of the platform side frame 40, and extend into the rim 68 to provide abutting shoulders 72. Triangular projections 74 extend inwardly from the lower end 62 of the first elongated member 54 and each includes an upper flat surface which abuts an associated shoulder 72 of the notches 70. This locking mechanism thereby ensures a one-way locking, as set forth below.

Specifically, the triangular shaped projections 74 on the lower end of the elongated member 54 permitted the elongated member to telescopically be positioned over the rim and have the projections securely locked into the notches. However, once the upper flat surfaces of the projections lock in place against the shoulders 72, it provides a secure locking mechanism which cannot be easily opened, where it is not meant to be unlocked once it is assembled. In this manner, the elongated member 54 can be initially provided separate from the platform and can easily be assembled by the user. However, once assembled it will be securely held connected to the platform so that the platform can easily be lifted up from the bottom of the container even if it contains the weight of the filtering material 55 without fear of having the platform disconnected from the elongated member. In this manner, the elongated member can serve as a handle for lifting up the platform.

A pie-shaped plug member, shown generally at 76 is provided for insertion into the upper end of the first elongated member 54. A C-shaped passageway 78 is formed adjacent the arcuate edge 80 of the plug 76 with upwardly extending C-shaped walls 82 substantially surrounding passageway 78. A tube or stem 84, tapered on both ends, extends through the plug 76 adjacent its apex 86, so that both ends extend outwardly from the top and bottom surfaces, respectively, of the plug. A releasable locking mechanism is provided to couple the plug 76 to the upper end of the first elongated member 54, as is best shown in FIGS. 2 and 6. The elongated member 54 includes a peripheral rim 88 adjacent the upper end 64 thereof forming a seat 90 which can accommodate the plug 76. Notches 92 are formed at the upper end 64 of the elongated member 54 to receive locking tabs 94 downwardly projecting from the plug 76 and including a lip which can fit into the notches 92. In this manner, the plug 76 can be easily assembled for retention onto the elongated member 54, where it can nevertheless be released for replacing a porous member or air diffuser 96, such as an air stone. The stem of the member 96 is coupled by means of a tube 98 to the bottom end of stem 84 through which the air stream is provided. An air tube 99 (FIG. 11) is coupled to the upper or top end of the stem 84 and is connected to an air pump (not shown) to provide a flow of air into the filter. The plug is preferably fabricated from polycarbonate known as Lexan and manufactured by General Electric, for better strength and deflectability. Furthermore, the polycarbonate of the stem 84 won't react with the conventionally soft PVC material of the tube 98 which, as shown in the drawings, is engaged on the stem 84 of the plug 76.

A second elongated member 100 of substantially C-shaped configuration is formed in an upwardly tapered arrangement whereby the cross sectional area of its upper end 102 is smaller than the cross sectional area of its lower end 104. The elongated member 100 can be telescopically positioned over the upwardly extending C-shaped walls 82 of the plug 76 to provide outlet means for the decontaminated water to flow back into the tank.

In operation, air is pumped through the air tube 99, passing through the stem 84, the tube 98 and the air diffuser 96 which disperses the air into the decontaminated water compartment defined by the first elongated member 54. The air will cause air activity and a suction therein. Contaminated water in the tank will thus be drawn through the slots 32 into the inlet compartment 26 and therefrom will pass through the open top portion into the filtration compartment 28. Filtration material 55 such as activated carbon and polyester floss is placed on top of the platform 36 in the filtration compartment so that water passing over the partition wall 30 and into the filtration compartment 28 can pass through the filtration material 55 and then down into the clear water chamber formed between the platform 36 and the bottom wall 16. The suction caused by the upward flowing air will cause the decontaminated water from the clean water chamber to pass through the passageway 60 into the decontaminated water compartment formed by the elongated member 54 and to flow upward with the air through the first elongated member 54 and through the passageway 78 of the plug 76 to the outlet means formed by the second elongated member 100 and back into the tank.

With the arrangement thus far described, it is possible that the filtration material 55, especially the polyester floss and other such fluffy materials, may extend over the filtration compartment and move into the inlet compartment thereby blocking the inflow of decontaminated water. Furthermore, the water flowing over the partition wall 30 may tend to immediately flow downward into the filtration material adjacent the partition wall and will not spread evenly across the filtration compartment. Accordingly, this arrangement is improved, as set forth below.

The present invention additionally provides a restraining plate, shown generally at 106 which can be positioned on the coplanar upper edges of the front and rear walls 18, 20 of the container 12. The restraining plate includes slots 108 providing perforations through which the water can flow. The slots are interconnected by supporting ribs 110 and an outer frame 112. The first elongated member 54, when positioned in the container, has its arcuate front wall 60 extending inside the filtration compartment. The shape of this wall is made so that it is symmetrical, in the common plane of the upper edge of the walls 18, 20, with the curved linear shape of the partition wall 30. Thus, at the plane of the upper edge of the walls of the container, the curved linear shape of the partition wall 30 and the curved linear shape of the arcuate wall 60 of the first elongated member 54 are substantially symmetrical. Arcuate reliefs 114, 115 are formed in the restraining plate in a symmetrical fashion. These are substantially equal and opposite relief sections. As a result, the restraining plate can be positioned in any one of four positions on the upper edges of the container, where it can be placed inverted or in reversed manner.

The restraining plate is utilized to compress the filtering material and confine it to a filtering section within the filtration compartment, where this filtering material must be compressed to be effective. It therefore provides a flow chamber above the restraining plate which is substantially free of filtration material. As a result, as the contaminated water flows from the inlet compartment 26 over the partition wall 30, it first flows through the flow chamber above the restraining plate 106 and then downward through the slots in the restraining plate and through the filtration material contained in the filtration section. The restraining plate 106 therefore allows for spreading out of the water and distributing it across the entire area of the filtration section to make use of substantially all of the filtration material and avoid concentrating of the filtering action to a particular area adjacent the inlet compartment. Furthermore, it provides an easy way of ensuring that a proper amount of filtration material has been provided and at the same time prevents the filtration material from separating and blocking proper flow circulation throughout the filter. It is noted that this arrangement provides a proper environment for the growth of aerobic bacteria in the filtration material, which aid in filtering the contaminated water.

A cover 14 is provided to releasably connect to the top of the container. The cover is formed with a substantially V-shaped top portion 116 including a front angled wall 118 and a rear angled wall 120. The front angled wall 118 is placed substantially over the inlet compartment 26 while the rear angled wall 120 is placed substantially over the filtration compartment 28. In this manner, directionality is achieved to guide the flow of water and thereby to improve the circulation and spreading out thereof. As the water flows from the inlet compartment over the partition wall 30, it is directed upwardly by means of the angled front wall 118 and is subsequently spread by means of the rather larger angled rear wall 120 throughout the flow chamber, where the sides of the rear wall 120 converge toward each other in the direction of the rear portion of the filter 10 for a better flow arrangement.

The cover 14 is formed with an outer rim 122 defining a ledge 124 which fits on the upper edges of the restraining plate 106 and the container. Sockets or openings 126 are formed at symmetrical positions along the side walls of the cover to accommodate upwardly projecting locking tabs 128 extending from the walls of the container. The locking tabs have an outwardly extending lip 130 which fits into the open sockets. One edge 132 of the tabs 128 is angled to facilitate insertion of the locking tabs into the sockets. Markings 134 provided on the container adjacent the locking tabs identify the places where pressure is to be applied against the container walls to release the locking tabs from the sockets of the cover thereby permitting removal of the cover from the container. The container further includes an arcuate relief 136 at the rear thereof, to accommodate the curved linear outer front wall 60 of the first elongated member 54.

Slots 140 are formed in the cover to provide additional inlets for the contaminated water from the tank, where the contaminated water drawn in through the slots 140 mixes with the contaminated water drawn in through the slots 32. Therefore, the filter 10 is provided with two sets of inlet slots, an upper level intake through slots 140 and a gravel level intake through slots 32.

The restraining plate 106 includes notches or recesses 142 to accommodate the locking tabs 128 projecting from the upper edges of the container. Although only two locking tabs are provided, it will be noted that four notches are located in the restraining plate to permit the above-mentioned four way insertion of the restraining plate on the container. Furthermore, a center aperture 144 is provided for insertion of a finger or tool into the restraining plate in order to facilitate its removal from the upper edges of the container. It should also be noted, that the front wall bight section 34 includes an upwardly extending rim 146 above the plane of the edges of the container. This rim 146 abuts against the corner edges of the restraining plate 106 and maintains it in place preventing it from moving forward. At the same time, as is best seen in FIGS. 9 and 10, a tab or projection 150 is formed on the lower rear end of the cover 14 to compress downward against the restraining plate and provide a suitable force to retain the plate in position. It will be understood that a raised tab or projection could as well be formed on the restraining plate and held down by the cover. In the above manner, the restraining plate is firmly held in place by the rim 146 at the front wall, and by the locking tabs projecting through the notches 142, as well as by the wall 60 of the first elongated member 54. These retaining and positioning parts will prevent lateral or side to side horizontal movement of the restraining plate. Against the upward force of the filtering material, the downward force of the ledge 124 of the cover coacting with the projecting tab 150 will prevent the restraining plate from moving up or down vertically from the upper edges of the container. Additionally, the tab 150 causes a counter force to act on the front wall 118 of of the cover 14 to hold the front wall 118 down against the container 12.

The container itself is formed of a shape to make it as compact and unobtrusive as possible. Preferably, the shape of the container is made substantially flat, whereby the height is rather shallow compared to the horizontal cross sectional area of the container. Thus, the height will be less than both length and width dimensions of the container itself.

To support the container and maintain it above the gravel bed in the aquarium filter, a downwardly projecting skirt 152 is formed from the bottom wall. A weighted member 154 is positioned within the skirt to provide sufficient weight for preventing the filter from floating, thus keeping the filter at the bottom of the tank. The weighted member 154 is necessary when using the new type of activated carbon mentioned above, where this new carbon is lighter in weight and more adsorbent than the old type of carbon, thus a smaller amount of the new carbon is required to be used in the filter. A series of slots 156 are provided in the skirt 152 so that air bubbles are not trapped between the skirt 152 and the weighted member 154, where air bubbles could cause the filter to float upwardly.

Preferably, the materials used in the construction of the entire filter will be of a transparent plastic material, formed in the various configurations, as for example, by a molding process. The weighted member 154 can advantageously be of a clear glass material, such as plate glass, which will provide the necessary weight needed.

It will therefore be appreciated that the bottom aquarium filter of the present invention provides substantial benefits. The restraining plate is utilized to maintain a proper amount of filtering material and can prevent it from blocking the proper flow circulation. At the same time, it allows distribution of the decontaminated water throughout the filtration section thereby providing more efficient use of the filtration material. The cover guides and directs such distribution of the water across the flow chamber. Additionally, various interlocking mechanisms are provided where the first elongated member of the air lift tube can be securely locked to the platform whereby although initially disassembled, once connected to the platform it can be utilized as a secure handle for the removal of the filter. The other locking mechanisms are all releasably coupled to permit replacing of the various filter components including the filtration material, the porous air member, etc., as well as to permit cleaning of the filter.

Furthermore, the parts are formed to permit easy assembly thereof. The restraining plate is formed in a manner to permit four-way insertion whereby it can be positioned inverted or reversed, and at the same time function properly. The remaining parts are all provided with appropriate shapes to permit only one-way insertion preventing any erroneous assembly thereof. The shape of the filter is such that it can fit at the bottom of the tank and be very unobtrusive. Also, it can easily fit in any corner of the tank. The C-shaped configuration of the upper elongated member extending upward from the container permits shielding of the air tubing and retains it in the corner of the tank thereby keeping it from moving and at the same time protecting it.

Figure 12:
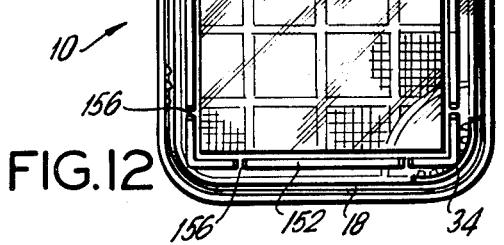
FIG. 12 is a bottom plan view of the filter.
Figure 3:
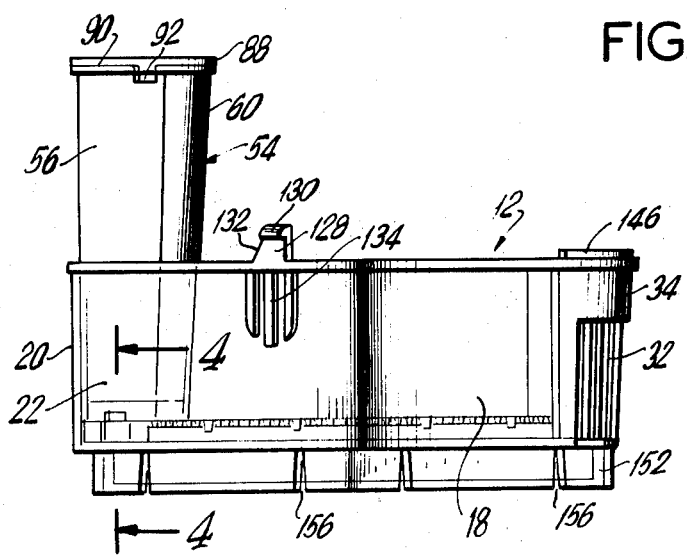
FIG. 3 is a side view of the filter.

In addition to the foregoing, and with special reference to FIGS. 12 and 13, it will be noted that the various parts of the filter are formed in a manner to provide easy assembly thereof for storage and packaging. Specifically, in its packaged form, the container 12 and the cover 14 can be utilized as the total outer housing in which all of the other parts are stored during packaging. Specifically the platform 36 can be placed at the bottom of the container with the first elongated member 54 and the second elongated member 100 lying across the platform. The plug 76 with the air stone 96 connected thereto can be inserted within the first elongated member 54 prior to its placement along the platform. The restraining plate 106 can now be positioned over the container upper edges and the cover 14 is then placed over all of the individual parts and locked onto the container 12 in the same manner mentioned above. In this manner, when storing or shipping, all of the parts can be contained within the assembled container and cover, and yet the user can easily locate, position and assemble the parts for appropriate use.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An aquarium filter for an aquarium tank, said filter comprising in combination:
a container having an inlet compartment in a fluid flow relationship with the tank, a filtration compartment in a fluid flow relationship with said inlet compartment, said filtration compartment being structured to contain a mass of filtering material, and a decontaminated water compartment in a fluid flow relationship with said filtration compartment; restraining means positioned in said filtration compartment for confining the filtering material to a filtering section of said filtration compartment and for providing in another section of said filtration compartment a flow chamber, said flow chamber connecting said inlet compartment with said filtering section in a fluid flow relationship, said restraining means including a restraining plate, said restraining plate being perforated to permit contaminated water to flow therethrough, said restraining plate maintaining said flow chamber substantially free of the filtering material;
said container having at least a bottom wall, front and rear walls, and a partition wall, said partition wall extending upwardly from said bottom wall and merging into said front wall to provide said inlet compartment, and openings in said front wall through which the contaminated water can flow into said inlet compartment;
upper edges of said front, rear, and partition walls all being disposed in a common plane, said restraining plate being supported on said upper edges in said common plane, and a cover extending above said upper edges, said cover including rim means disposed on said restraining plate for maintaining said restraining plate in position on said upper edges;
said cover further including wall means for directing the contaminated water from said inlet compartment laterally across said flow chamber, said wall means including a substantially inverted V-shaped top wall to provide two inclined sections, one inclined section of said top wall being substantially positioned over said inlet compartment, and the other inclined section of said top wall being substantially positioned above said restraining plate defining said flow chamber;
air stream supply means disposed in said container for directing air into said decontaminated water compartment, and outlet means coupled to said decontaminated water compartment for an egress of decontaminated water and air out of said decontaminated water compartment;
whereby contaminated water from the tank enters through said front wall openings into said inlet compartment and passes therefrom into said flow chamber, and then passes through said perforated restraining plate into said filtering section where said contaminated water is substantially decontaminated by the filtering material before passing into said decontaminated water compartment and being egressed through said outlet means into the tank.

2. An aquarium filter as in claim 1, wherein said bottom wall extends into said inlet compartment and said filtration compartment in a common plane, and said openings extend upwardly from said bottom wall and at least partway up said front wall.

3. An aquarium filter as in claim 1, wherein said air stream supply means includes an elongated member, said elongated member defining said decontaminated water compartment and being retained adjacent said rear wall of the container, a front wall of said elongated member being positioned internally of said filtration compartment, respective shapes of said elongaged member front wall and said partition wall being symmetrical in said common plane, said restraining plate including symmetrical relief portions to accommodate said partition wall and said elongated member front wall, whereby said restraining plate is reversibly positionable in said common plane.

4. An aquarium filter as in claim 1, wherein said container further comprises upwardly extending locking tabs symmetrically located along said upper edges for releasably coupling said cover to said container, and wherein said restraining plate further comprises symmetrically positioned notches for accommodating said tabs.

5. An aquarium filter as in claim 1, wherein a portion of said container front wall defining said inlet compartment further comprises an upwardly extending rim for maintaining said restraining plate in position on said upper edges.

6. An aquarium filter as in claim 1, further comprising projecting means for maintaining a force between said cover and said restraining plate for additionally maintaining said restraining plate in position on said upper edges.

7. An aquarium filter as in claim 1, wherein said restraining plate further comprises aperture means for facilitating removal thereof from said upper edges.

8. An aquarium filter as in claim 1, further comprising a perforated platform positioned in said container for dividing said filtering section into a filter chamber and a clean water chamber in a fluid flow relationship therebetween through said platform, whereby the filtering material is retained in said filter chamber.

9. An aquarium filter as in claim 8, further comprising support means for supporting said perforated platform in a spaced relationship with said bottom wall, said clear water chamber being disposed between said bottom wall and said platform.

10. An aquarium filter as in claim 9, further comprising an elongated hollow member defining said decontaminated water compartment and being retained adjacent said rear wall of the container, a passageway in said platform connecting said clear water chamber with said elongated member in a fluid flow relationshp, said air stream supply means and said outlet means being coupled to said elongated member to send air into said elongated member and permit air and decontaminated water to flow out of said elongated member.

11. An aquarium filter as in claim 10, further comprising a pie-shaped member insertible into an upper end of said elongated member, a C-shaped passageway provided in said pie-shaped member concentrically adjacent to an arcuate edge of said pie-shaped member, said C-shaped passageway providing a part of said outlet means, and tube means spaced from said C-shaped passageway and extending through said pie-shaped member adjacent to an apex thereof, said tube means providing a part of said air stream supply means.

12. An aquarium filter as in claim 11, further comprising a C-shaped rim upwardly extending from said pie-shaped member and being disposed about said C-shaped passageway, and a C-shaped elongated member telescopically positionable over said C-shaped rim, said C-shaped elongated member being tapered with its upper end having a smaller cross section than its lower end.

13. An aquarium filter as in claim 11, wherein said air stream supply means further comprises a porous body positionable within said elongated member, and a tubular connection for releasably coupling said porous body to said tube means in said pie-shaped member.

14. An aquarium filter as in claim 10, wherein said elongated member is of pie-shaped configuration in cross section, said elongated member being longitudinally tapered with a cross sectional area at its upper end being greater than a cross section area at its lower end.

15. An aquarium filter as in claim 14, wherein said platform includes an upwardly extending pie-shaped rim disposed about said passageway for telescopically receiving the lower end of said elongated member, and locking means for securely locking said elongated member onto said platform.

16. An aquarium filter as in claim 15, wherein said locking means includes recesses provided in said pie-shaped rim for establishing shoulders therein, and includes inwardly extending projections disposed adjacent to the lower end of said elongated member; said projections including engaging faces for abutting against said shoulders to provide a non-releasable locking device.

17. An aquarium filter as in claim 1, further comprising opening means provided in said cover to allow contaminated water from the tank to flow into said flow chamber.

18. An aquarium filter as in claim 1, wherein said container further comprises a skirt downwardly extending from said bottom wall, and weight means coupled within said skirt for providing a weighted base for said container.

19. An aquarium filter as in claim 18, wherein said skirt is disposed around said weight means in a spaced apart relationship to confine said weight means therein, said skirt being provided with slot means to avoid air from being trapped in the space between said skirt and said weight means.

20. An aquarium filter as in claim 18, wherein parts of said filter except for said weight means are comprised of a transparent plastic material, said weight means being comprised of a glass material.

* * * * *